United States Patent [19]
Manzolli

[11] Patent Number: 5,779,409
[45] Date of Patent: Jul. 14, 1998

[54] TORQUE LIMITING RETENTION SUBASSEMBLY FOR FLOATING INSERT THREADED FASTENER ASSEMBLIES

[75] Inventor: James J. Manzolli, Ansonia, Conn.

[73] Assignee: Sikorsky Aircraft Corporation, Stratford, Conn.

[21] Appl. No.: 825,043

[22] Filed: Mar. 27, 1997

[51] Int. Cl.$^6$ .................... F16B 31/00; F16B 39/00
[52] U.S. Cl. .................................. 411/7; 411/105
[58] Field of Search ....................... 411/1, 6, 7, 9, 411/10, 11, 103, 105, 111, 112, 113, 125

[56] References Cited

U.S. PATENT DOCUMENTS

| | | | |
|---|---|---|---|
| 3,289,524 | 12/1966 | Rubin | 411/7 |
| 3,555,491 | 1/1971 | Moss | 411/7 |
| 4,609,314 | 9/1986 | Metz | 411/7 |
| 4,687,392 | 8/1987 | Bidwell | 411/6 |
| 4,692,075 | 9/1987 | Matz | 411/7 |
| 4,884,930 | 12/1989 | Dobbeler | 411/6 |

*Primary Examiner*—Flemming Saether
*Attorney, Agent, or Firm*—Brian A. Collins

[57] ABSTRACT

A retention subassembly for FI threaded fastener assemblies, which retention subassembly is operative to limit the torque, and consequently, the loads acting on the FI threaded fastener assembly and/or on the components coupled thereby. The retention subassembly includes a cage assembly and a Floating Threaded (FT) insert disposed within an internal chamber of the cage assembly. Furthermore, the FT insert includes a threaded bore for accepting a threaded fastener of the FI threaded fastener assembly. The retention subassembly further comprises a first torque reacting means for reacting torque when the threaded fastener is caused to engage the threaded bore, a means for disengaging the first torque reacting means in response to a threshold magnitude of torque, and a second torque reacting means for reacting torque when the threaded fastener is caused to disengage the threaded bore. The disengagement means may include a spring bias element disposed between an upper end cap of the cage assembly and the FT insert, and an engagement surface formed in combination with the FT insert, which engagement surface has an axial length. The spring bias element is characterized by a predetermined spring rate stiffness and a predefined deflection length which, in combination, produce a spring bias force. The spring bias force is a function of the threshold magnitude of torque and the axial engagement length of the engagement surface is substantially equal to the predefined deflection length of the spring bias element.

11 Claims, 3 Drawing Sheets

TORQUE LIMITING RETENTION SUBASSEMBLY FOR FLOATING INSERT THREADED FASTENER ASSEMBLIES

This invention was made with Government support Contract No. DAAJ09-91-C-A004 awarded by the Department of the Army. The Government has certain rights in this invention.

TECHNICAL FIELD

This invention is directed to Floating Insert (FI) threaded fastener assemblies for coupling components, and, more particularly, to a retention subassembly therefor which is operative to limit the torque, and, consequently, the loads acting on the FI threaded fastener assembly and/or on the coupled components.

BACKGROUND OF THE INVENTION

Floating Insert (FI) threaded fastener assemblies have widespread use in the aviation and automotive industries for applications wherein the structural connection between coupled components does not require highly precise alignment and wherein the components are frequently decoupled for access to underlying components. Such FI threaded fastener assemblies are typically characterized by a retention subassembly secured in combination with one of the components, which retention subassembly receives a threaded fastener for coupling the components. More specifically, the retention subassembly typically includes a cage assembly defining a chamber for accepting a floating insert having a threaded bore (hereinafter referred to as a Floating Threaded (FT) insert). The cage assembly is operative to retain the FT insert so as to prevent rotation thereof in a torquewise direction, i.e., about the axis of the threaded bore, while permitting a small degree of radial displacement. Regarding the latter, the FT insert may shift radially to accommodate a nominal degree of misalignment when receiving the threaded fastener, thereby tolerating machining/manufacturing deviations which may occur prior to final assembly of the components.

The structural integrity or strength of the FI threaded insert assembly is determined, inter alia, by the torque acting on the threads thereof. It will be appreciated that the applied torque imposes shear loads on the threads of the fastener assembly, tensile loads in the shaft and/or head of the threaded fastener, and compressive loads in the coupled components. Accordingly, to optimize the strength of the FI threaded fastener assembly, it is important to effect a preload on the threads thereof which is within the elastic deformation range of the materials employed, i.e., below the yield strength thereof.

It is this design criterion that, in certain critical design applications, dictates the use of torque indicating/limiting devices such as a torque wrench. As such, the installation of the threaded fastener typically involves a two-step assembly process. Firstly, the threaded fastener is rapidly installed (i.e., turned) via a screwdriver or ratchet wrench. Generally, the assembly operator proceeds until the head of the threaded fastener seats against the structure or component to be secured and is within several turns of the desired torque. Secondly, a torque wrench is employed to perform the final few turns while the assembly operator either attends to the torque limiting indicator or determines that the torque wrench is no longer imparting rotation to the threaded fastener.

The assembly procedure described above together with the requirement for specialized tooling, e.g., a torque wrench, presents a combination of assembly, logistic and fiscal disadvantages. Firstly, the installation procedure is dependent upon the proficiency of the assembly operator inasmuch as the assembly operator must "judge" when the threaded fastener is within a few turns of the desired torque. It is not uncommon for the assembly operator to over-torque the fastener assembly before performing the subsequent torque wrench operation. Secondly, the requirement for a torque wrench, or a torque wrench for each variety of FI threaded fastener assembly (i.e., fastener assemblies having different torque load requirements) produces logistic problems, particularly in the field, i.e., locations remote from a primary maintenance facility. It will be appreciated that this requirement imposes yet additional burdens with respect to the number of special tools which must be available to the end-user, e.g., the automobile or aircraft operator. Finally, the installation procedure requires two operational steps which may substantially increase the time associated with installation. Based on time-study analyzes, such procedure may increase installation time by a factor of about 1.5, thereby substantially increasing direct maintenance costs. While this fiscal burden may be acceptable for applications having only a few such fastener assemblies, the cost impact may be severe for applications having multiple installations.

SUMMARY OF THE INVENTION

It is an object of the present invention to provide a retention subassembly for a Floating Insert (FI) threaded fastener assembly, which retention subassembly is operative to limit the applied torque acting on the threads of the FI threaded fastener assembly for maximizing the strength thereof.

It is another object of the present invention to provide such a retention subassembly which eliminates the requirement for special tooling such as a torque indicating/limiting device.

It is yet another object of the present invention to provide such a retention subassembly which eliminates the propensity for operator error when assembling such FI threaded fastener assemblies.

It is yet a further object of the present invention to provide such a retention subassembly which decreases installation time, and consequently, direct maintenance costs.

These and other objects of the present invention are achieved by a retention subassembly for FI threaded fastener assemblies, which retention subassembly is operative to limit the torque, and consequently, the loads acting on the FI threaded fastener assembly and/or on the components coupled thereby. The retention subassembly includes a cage assembly and a Floating Threaded (FT) insert disposed within an internal chamber of the cage assembly. Furthermore, the FT insert includes a threaded bore for accepting a threaded fastener of the FI threaded fastener assembly. The retention subassembly further comprises a first torque reacting means for reacting torque when the threaded fastener is caused to engage the threaded bore, a means for disengaging the first torque reacting means in response to a threshold magnitude of torque, and a second torque reacting means for reacting torque when the threaded fastener is caused to disengage the threaded bore. The disengagement means may include a spring bias element disposed between an upper end cap of the cage assembly and the FT insert, and an engagement surface formed in combination with the FT insert, which engagement surface has an axial length. The spring bias element is characterized by a predetermined spring rate stiffness and a predefined deflection length which, in combination, produce a spring bias force. The spring bias force is a function of the threshold magnitude of torque. The axial engagement length of the engagement surface is substantially equal to the predefined deflection length of the spring bias element.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 6a and 6b depict alternative embodiments of the cage assembly and the FT insert which may be employed to define the first torque reacting means; and FIGS. 7a-7c depict alternate spring bias elements used in the disengagement means.

BEST MODE FOR CARRYING OUT THE INVENTION

Figure 1:
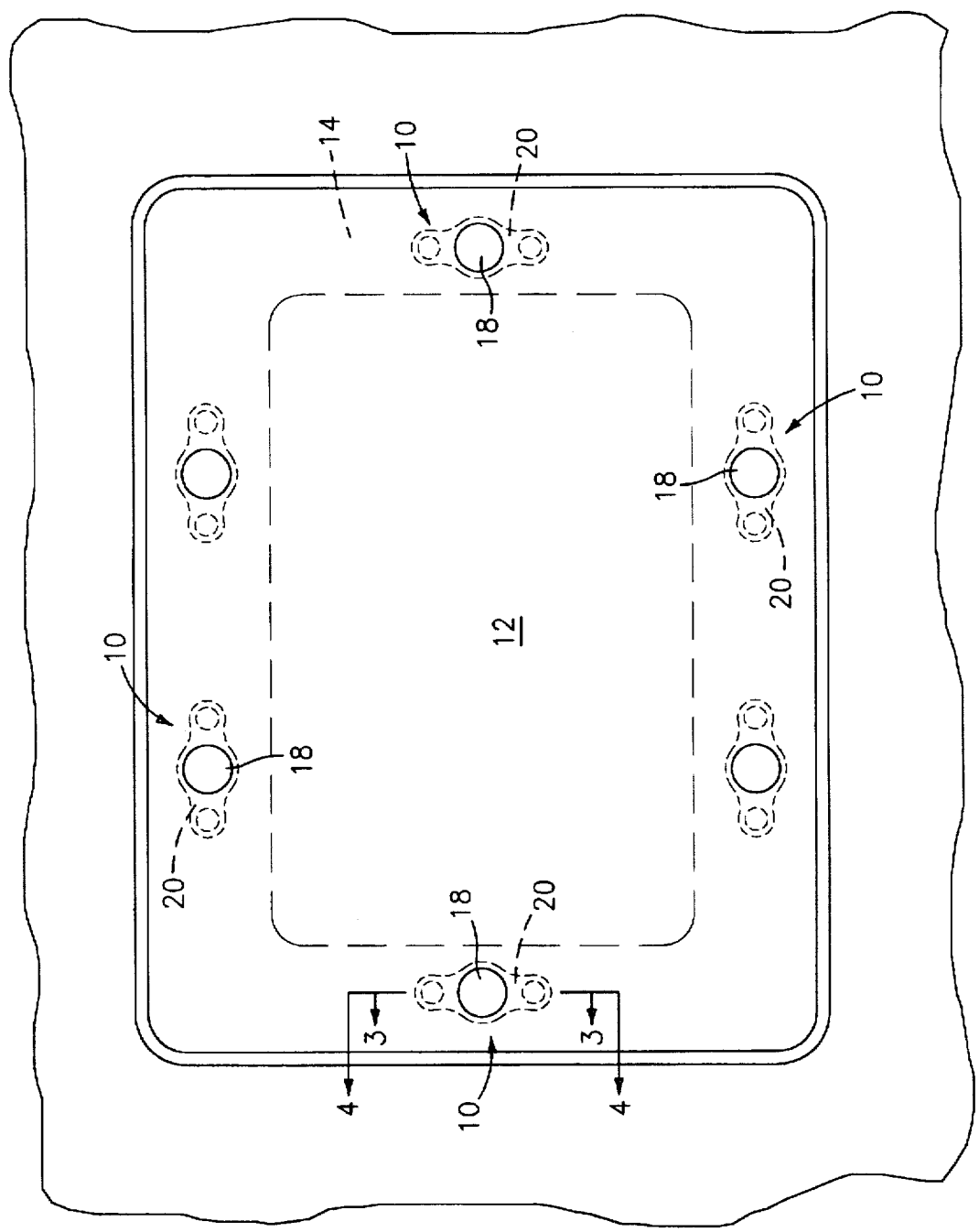
FIG. 1 depicts a plurality of Floating Insert (FI) threaded fastener assemblies for coupling an aircraft access panel to a supporting panel frame, which FI threaded fastener assembly includes a retention subassembly according to the present invention.
Figure 2:
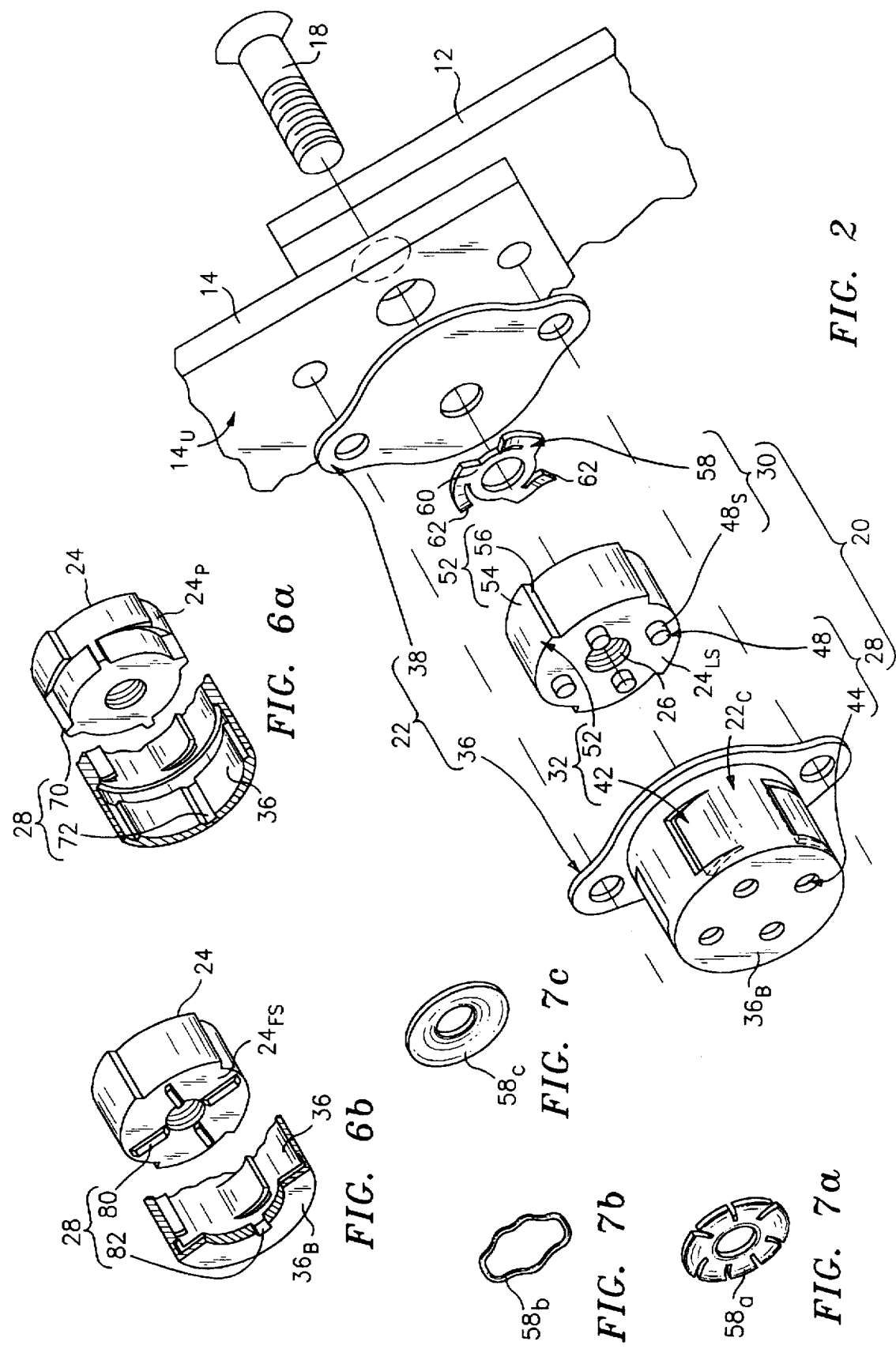
FIG. 2 depicts an exploded view of the retention subassembly for revealing the internal arrangement thereof including, inter alia: a cage assembly, a Floating Threaded (FT) insert for accepting a threaded fastener, a first torque reacting means, a disengagement means, and a second torque reacting means.

Referring now to the drawings wherein like reference characters identify corresponding or similar elements throughout the several views, FIGS. 1 and 2 depict an exemplary embodiment of the present invention wherein a plurality of Floating Insert (FI) threaded fastener assemblies 10 are operative to couple an aircraft access panel 12 to a supporting panel frame 14. Each FI threaded fastener assembly 10 includes a threaded fastener 18 for engaging a retention subassembly 20 according to the present invention.

Each retention subassembly 20 comprises: a cage assembly 22 defining an internal chamber $22_C$, a Floating Threaded (FT) insert 24 having a threaded bore 26 for accepting the threaded fastener 18, a first torque reacting means 28 for reacting torque when the threaded fastener 18 is caused in engage the threaded bore 26, a means 30 for disengaging the first torque reacting means 28 in response to a threshold magnitude of torque applied by the threaded fastener 18, and, a second torque reacting means 32 for reacting torque when the threaded fastener 18 is caused to disengage the threaded bore 26. Before discussing the operation of the retention subassembly 20, a brief description of the structural, functional and assembly details thereof will be provided.

Figure 3:
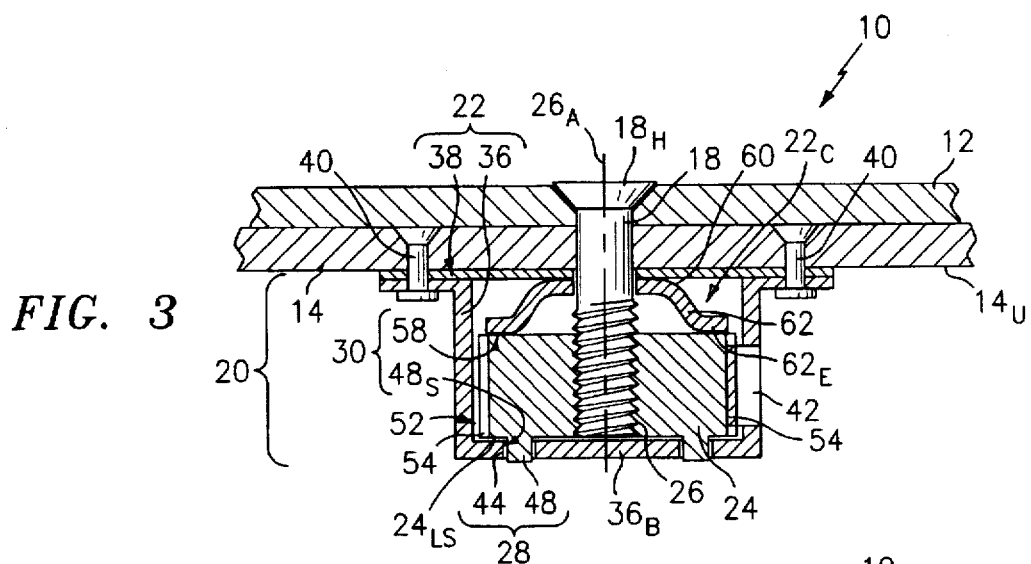
FIG. 3 is a cross-sectional view taken substantially along line 3—3 of FIG. 1 wherein the threaded fastener threadably engages the FT insert of the retention subassembly and wherein the first torque reacting means inhibits rotational motion of the FT insert when an engaging torque is applied by the threaded fastener.

In FIGS. 2 and 3, the cage assembly 22 includes a cup-shaped housing 36 and an upper end cap 38 which are secured in combination with the underside $14_U$ of the panel frame 14 via rivet-type fasteners 40 (not shown in FIG. 2). In the described embodiment, the cup-shaped housing 36 includes a plurality of inwardly projecting spring tabs 42 which are disposed about a peripheral portion of the housing 36. Furthermore, a plurality of anti-rotation apertures 44 are formed in the base $36_B$ of the housing 36. The import of the spring tabs 42 and the anti-rotation apertures 44 will become apparent when discussing the operation of the retention subassembly 20.

The FT insert 24 is disposed within the internal chamber $22_C$ of the cage assembly 22 and includes a plurality of axially aligned pins 48 which are formed in combination with a lower face surface $24_{LS}$ of the FT insert 24. Furthermore, the pins 48 are spatially positioned so as to compliment the arrangement of the anti-rotation apertures 44 of the housing 36 and define engagement surfaces $48_S$ which mateably engage the apertures 44. Additionally, the FT insert 24 defines a plurality of stepped-cams 52 (best shown in FIG. 2) wherein each stepped cam 52 defines an arcuate surface 54 and an abutment surface 56. Finally, the pins 48 and stepped cams 52 of the FT insert 24 are undersized relative to the dimensions of the anti-rotation apertures 44 and the chamber $22_C$, respectively, of the housing 36 so as to permit radial displacement of the FT insert 24 relative thereto. While such relative dimensions will vary depending upon the application, the FT insert 24 is permitted to "float" radially by about 0.03 inches.

In the broadest sense of the invention, the first torque reacting means 28 is any combination of elements or structural features which inhibit rotational displacement (i.e., in a torquewise direction about the axis $26_A$ of the threaded bore 26) of the FT insert 24 relative to the cage assembly 22. In the described embodiment, the first torque reacting means 28 is defined by the functional interaction of the axially aligned pins 48 and the anti-rotation apertures 44 of the housing 36. That is, the pins 48 may be axially and rotationally positioned so as to engage the anti-rotation apertures 44 of the housing 36, thereby fixing the rotational position of the FT insert 24 relative to the cage assembly 22. Other embodiments of the first torque reacting means 28 will be described and illustrated in subsequent views.

The disengagement means 30 is any means for effecting disengagement of the first torque reacting means 28 in response to a threshold magnitude of torque applied by the threaded fastener 18, i.e., when the threaded fastener 18 engages the threaded bore 26 of the FT insert 24. In the described embodiment, the disengagement means 30 is defined by a finger washer 58 disposed between the FT insert 24 and the upper end cap 38 of the cage assembly 22, and the flnctional interaction of the engagement surfaces $48_S$ of the axially aligned pins 48 and the apertures 44 of the housing 36. More specifically, the finger washer 58 includes a central ring 60 and a plurality of spring fingers 62 which project from the central ring 60 such that the end portions $62_E$ (FIG. 3) of the spring fingers 62 are out-of-plane with respect to the central ring 60. Functionally, the finger washer 58 biases the FT insert 24 downwardly, toward the base $36_B$ of the cage assembly 22 and provides a predetermined spring bias force as a finction of its spring rate stiffness and a desired or predefined deflection length. Moreover, the predetermined spring bias force is selected as a function of the steady and fatigue allowables of the materials employed in the construction of the FT insert 24 and the threaded fastener 18. These aspects of the invention will be discussed in greater detail below.

The second torque reacting means 32 may be any combination of elements or structural features which inhibit counter-rotation of the FT insert 24 relative to the cage assembly 22 when a disengaging torque is applied, i.e., when the threaded fastener 18 is caused to disengage the threaded bore 26 of the FT insert 24. In the described embodiment, the second torque reacting means 32 is defined by the functional interaction of the spring tabs 42 of the housing 36 and the stepped cams 52 of the FT insert 24. That is, the spring tabs 42 may be rotationally positioned so as to engage the abutment surfaces 56 of the step cams 52, thereby fixing the rotational position of the FT insert 24 relative to the cage assembly 22. The spring tabs 42 are, furthermore, resilient in a radial direction, i.e., about a vertical effective hinge, so as to permit the desired floating characteristics of the FT insert 24.

Figure 4:
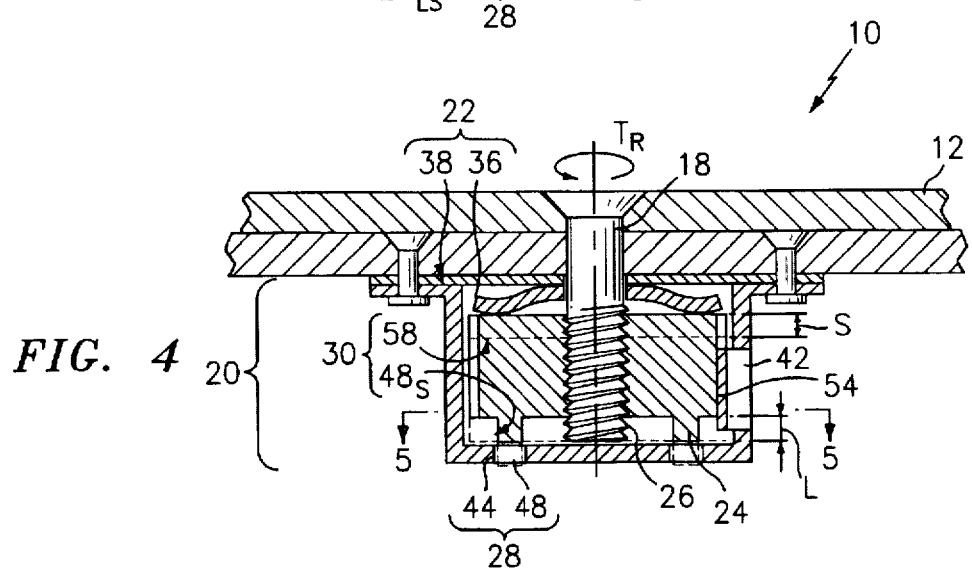
FIG. 4 is cross-sectional view taken substantially along line 4—4 of FIG. 1 wherein the disengagement means of the retention subassembly effects disengagement of the first torque reacting means in response a to threshold magnitude of torque.
Figure 5:
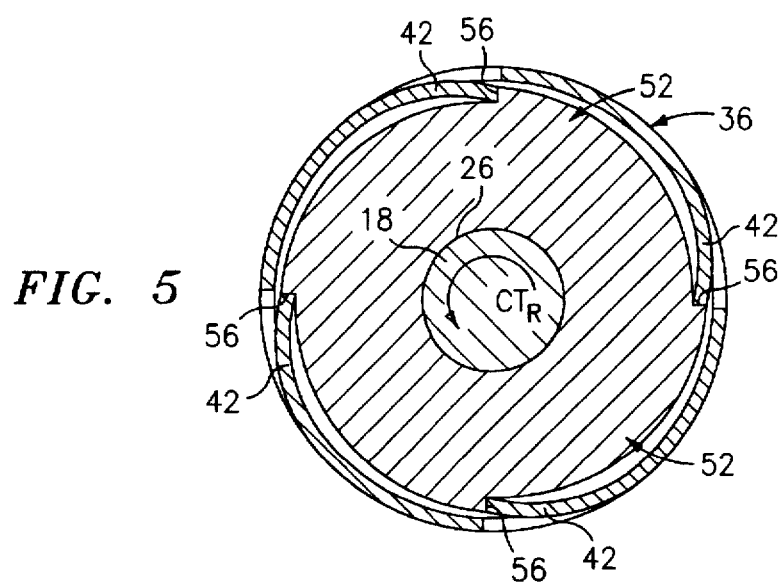
FIG. 5 is cross-sectional view taken substantially along line 5—5 of FIG. 4 wherein the second torque reacting means inhibits counter-rotation of the FT insert when a disengaging torque is applied by the threaded fastener.

In FIGS. 3 through 5, the retention subassembly 20 is depicted in three positions so as to view the sequence of operation. In FIG. 3, the threaded fastener 18 is shown in engagement with the threaded bore 26 of the FT insert 24 such that the head $18_H$ of the threaded fastener 18 is within several turns of being seated upon the face of the access panel 12. The FT insert 24 is biased downwardly by the spring force of the finger washer 30 and the pins 48 thereof are engaged with the anti-rotation apertures 44 of the housing 36. As such, the torque applied by the threaded fastener 18 is reacted by the mechanical interaction of the pins 48 and the anti-rotation apertures 44.

In FIG. 4, the threaded fastener 18 is seated against the access panel 12 and is fully engaged with the FT insert 24 for coupling the panel 12 to the panel frame 14. Furthermore, the FT insert 24 has translated axially toward the upper end plate 38 of the cage assembly 22 thereby deforming the finger washer 58 and disengaging the pins 48 from the anti-rotation apertures 44. In this position, a desired or threshold magnitude of torque has been applied by the threaded fastener 18 for optimizing the strength of the FI threaded fastener assembly 10.

As used herein, the desired or threshold magnitude of torque is defined as a torque level which produces shear and axial forces on the FI threaded fastener assembly 10, which shear forces are below the yield strength of the threaded connection in shear and which axial forces are below the yield strength of the threaded fastener 18 in tension. Generally, threshold torque levels which satisfy this design criterion are well-established in the art, i.e., are available in published engineering handbooks, and are typically a function of the diameter, material and thread pitch of the particular threaded fastener.

To establish or set the requisite spring bias force, a calculation is performed as a finction of the threshold magnitude of torque, the diameter of the threaded fastener 18, the spring rate stiffness of the finger washer 58, and a desired or predefined deflection length s of the finger washer 58. With respect to the latter, it will be appreciated that the predefined deflection length s determines the axial engagement length L of the engagement surface $48_S$, of each pin 48 or, stated in other terms, the length of engagement between the pins 48 and the anti-rotation apertures 44. Insofar as the described embodiment of the retention subassembly 20 defines is an axial arrangement wherein the loads are acting in the same direction as the shear and tensile loads to be examined, the calculation of the spring bias force is straightforward and is proportional to such loads in accordance with the following relationship:

$$S_f = T/(c)(D)(k)(s)$$

wherein:

$S_f$ is the spring bias force (lbs.);

T is the threshold magnitude of torque (in-lbs.) for a given threaded fastener;

D is the diameter (inches) of the threaded fastener;

k is the spring rate stiffness (in./in.) of the finger washer;

s is the deflection length (inches) of the finger washer; and c is the desired safety factor (dimensionless) for a given FT threaded fastener assembly (typically about 0.2).

Upon activation of the disengagement means 30, additional torque cannot be applied to the FT insert 24 inasmuch as the FT insert 24 is free to rotate but for the frictional forces acting between the finger washer 58 and/or the spring tabs 42 and the FT insert 24. With respect to the latter, and referring to FIGS. 4 and 5, the spring tabs 42 ride on the arcuate surfaces 54 of the stepped cams 52 so as to permit rotation of the FT insert 24 in a torquewise direction $T_R$.

In FIG. 5, the second torque reacting means 32 is shown wherein the spring tabs 42 of the housing 36 are engaged with the abutment surfaces 56 of the stepped cams 52. In this operating position, the threaded fastener 18 may be disengaged from the threaded bore 26 of the FT insert 24 insofar as the spring tabs 42 inhibit rotational motion thereof in a counter-torque direction $CT_R$. Upon removal of the threaded fastener 18, the disengagement means is de-activated such that the finger washer resets the retention subassembly, i.e., urges the pins into engagement with the anti-rotation apertures, for subsequent use.

Although the invention has been shown and described with respect to an exemplary embodiment thereof, it should be understood by those skilled in the art that other changes, omissions and additions may be made therein and thereto, without departing from the spirit and scope of the present invention. For example, in FIG. 6a an alternate embodiment of the first torque reacting means 28 is shown wherein a plurality of tabs 70 project radially from a peripheral surface $24_P$ of the FT insert 24, and wherein each tab 70 engages an open-ended axial slot 72 formed internally of the housing 36. In this embodiment, disengagement of the tabs 70 is effected when the tabs translate beyond the open end of the slots 72. FIG. 6b depicts yet another embodiment of the first torque reacting means 28 wherein a plurality of keys 80 project axially from the lower face surface $24_{FS}$ of the FT insert 24 and wherein each key 80 engages radially oriented slots 82 formed in the base $36_B$ of the housing 36. Yet another embodiments (not shown) may include a plurality of dimples projecting axially from the lower face surface of the FT insert, which dimples engage a plurality of detents formed in the base of the housing. While the above-described embodiments depict an equal number of interacting elements, e.g., an equal number of pins 48 and anti-rotation apertures 44, it should be appreciated that such numeric relationship need not be equal. For example, two pins 48 may engage two of four anti-rotation apertures 44 such that the FT insert 24 may be re-set in a quarter-turn rather than a half-turn of the threaded fastener 18.

It will also be appreciated that the interacting elements of the first and/or second torque reacting means 28 and/or 32 may be associated with either the FT insert 24 or the housing 36. For example, the axially aligned pins may be formed in combination with the housing and the anti-rotation apertures may be formed internally of the FT insert. Similarly, the spring tabs may be formed integrally with the FT insert while the stepped-cams may be formed along an internal peripheral surface of the housing.

It will should also be appreciated that various spring bias elements may substituted for the finger washer 58 of the disengagement means 30. For example, FIGS. 7a through 7c show a family of spring elements which may be employed including a slotted washer 58a (FIG. 7a), a wave washer 58b (FIG. 7b), and a Belleville spring 58c (FIG. 7c). The selection of such spring bias element will generally depend upon the spring rate stiffness requirements of a particular design. Furthermore, while the disengagement means 30 has been described in the context of disengaging the axially aligned pins 48, i.e., the engagement surfaces 48$_S$ thereof, from the anti-rotation apertures 44, it should be understood, particularly in view of the alternate embodiments of the first torque reacting means 28, that the disengagement means 30 contemplates the use of any engagement surface formed in combination with the FT insert 24 having an axial engagement length. Accordingly, it will be appreciated that the axial length of the engagement surface is defined by the predefined deflection of the spring bias element or, alternatively, defines the requisite spring rate stiffness to effect the desired spring bias force.

In summary, the retention subassembly 20 according to the present invention ensures optimum strength of the FI threaded fastener assembly 10 inasmuch as the initial preload imposed by the threaded fastener 18 is within the desired elastic deformation range of the materials employed. Furthermore, the retention subassembly 20 eliminates the potential for operator error inasmuch the assembly operator may rotate the threaded fastener until properly seated without concern for applying potentially damaging torque loads. Moreover, the retention subassembly 20 provides the requisite torque limiting features as an integral element of the FI threaded fastener assembly. Hence, special tooling such as a torque wrench which must be stored and available to the assembly operator/end-user are eliminated. Lastly, the retention subassembly 20 is fiscally advantageous insofar as only one assembly operation is required. That is, the requirement for alternating tools during assembly, e.g., from a screwdriver to a torque wrench, is eliminated.

What is claimed is:

1. A retention subassembly (20) for Floating Insert threaded fastener assemblies (10), the retention subassembly (20) operative to accept a threaded fastener (18) for coupling components, comprising:

a cage assembly (22) defining an internal chamber (22$_C$);

a floating threaded insert (24) disposed within said internal chamber (22$_C$) and having a threaded bore (26) for accepting the threaded fastener (18);

first torque reacting means (28) for reacting torque when the threaded fastener (18) is caused to engage said threaded bore (26);

disengagement means (30) for disengaging said first torque reacting means 28 in response to a threshold magnitude of torque;

said disengagement means (30) including:

a spring bias element (58, 58a, 58b, or 58c) disposed between an upper end cap (38) of said cage assembly (22) and said floating threaded insert (24): and an engagement surface (48$_S$) formed in combination with said floating threaded insert (24) and having an axial engagement length L, said spring bias element (58, 58a, 58b, or 58c) having a predetermined spring rate stiffness and a predefined deflection length (s) which, in combination, produce a spring bias force, said spring bias force being a function of said threshold magnitude of torque, and said axial engagement length L of said engagement surface (48$_S$) being substantially equal to said predefined deflection length (s) of said spring bias element (58, 58a, 58b, or 58c); and second torque reacting means (32) for reacting torque when the threaded fastener (18) is caused to disengage said threaded bore (26).

2. The retention subassembly (20) according to claim 1 wherein said spring bias element (58, 58a, 58b, or 58c) is selected from a group of spring elements consisting of: finger washers (58), slotted washers (58a), wave washers (58b) and Belleville 4 springs (58c).

3. The retention subassembly (20) according to claim 1 wherein said first torque reacting means (28) includes a plurality of axially aligned pins (48) formed in combination with said floating threaded insert (24) and a plurality of anti-rotation apertures (44) formed in said cage assembly (22), said axially aligned pins (48) engaging said anti-rotation apertures (44); and wherein said engagement surface (48$_S$) is formed along each of said axially aligned pins (48).

4. The retention subassembly (20) according to claim 3 wherein said second torque reacting means (32) includes a plurality of inwardly projecting spring tabs (42) disposed about a peripheral portion of said cage assembly (22), and plurality of stepped-cams (52) disposed about said floating threaded insert (24), each stepped cam (52) defining an arcuate surface (54) and an abutment surface (56), said spring tabs (54) riding upon said arcuate surfaces (54) for facilitating torquewise rotation of said floating threaded insert (24) and engaging said abutment surfaces (56) for inhibiting counter-rotation of said floating threaded insert (24).

5. The retention subassembly (20) according to claim 3 wherein said spring bias element (58, 58a, 58b, or 58c) is selected from a group of spring elements consisting of: finger washers (58), slotted washers (58a), wave washers (58b) and Belleville springs (58c).

6. The retention subassembly (20) according to claim 1 wherein said first torque reacting means (28) includes a plurality of tabs (70) projecting radially from a peripheral surface (24$_P$) of said floating threaded insert (24), and a plurality of open-ended slots (72) formed internally of said cage assembly (22), said radially projecting tabs (70) engaging said open-ended slots (72), and wherein said engagement surface is formed along each of said radially projecting tabs (70).

7. The retention subassembly (20) according to claim 6 wherein said second torque reacting means (32) includes a plurality of inwardly projecting spring tabs (42) disposed about a peripheral portion of said cage assembly (22), and plurality of stepped-cams (52) disposed about said floating threaded insert (24), each stepped cam (52) defining an arcuate surface (54) and an abutment surface (56), said spring tabs (54) riding upon said arcuate surfaces (54) for facilitating torquewise rotation of said floating threaded insert (24) and engaging said abutment surfaces (56) for inhibiting counter-rotation of said floating threaded insert (24).

8. The retention subassembly (20) according to claim 6 wherein said spring bias element (58, 58a, 58b, or 58c) is selected from a group of spring elements consisting of: finger washers (58), slotted washers (58a), wave washers (58b) and Belleville springs (58c).

9. The retention subassembly (20) according to claim 1 wherein said the first torque reacting means (28) includes a plurality of keys (80) projecting axially from the lower face surface ($24_{FS}$) of the FT insert (24), and a plurality of slots (82) formed in said cage assembly (22), said axially projecting keys (80) engaging said slots (82), and wherein said engagement surface is formed along each of said axially projecting keys (80).

10. The retention subassembly (20) according to claim 9 wherein said second torque reacting means (32) includes a plurality of inwardly projecting spring tabs (42) disposed about a peripheral portion of said cage assembly (22), and plurality of stepped-cams (52) disposed about said floating threaded insert (24), each stepped cam (52) defining an arcuate surface (54) and an abutment surface (56), said spring tabs (54) riding upon said arcuate surfaces (54) for facilitating torquewise rotation of said floating threaded insert (24) and engaging said abutment surfaces (56) for inhibiting counter-rotation of said floating threaded insert (24).

11. The retention subassembly (20) according to claim 9 wherein said spring bias element (58, 58a, 58b, or 58c) is selected from a group of spring elements consisting of: finger washers (58), slotted washers (58a), wave washers (58b) and Belleville springs (58c).

* * * * *